United States Patent [19]
Robins et al.

[11] Patent Number: 5,005,128
[45] Date of Patent: Apr. 2, 1991

[54] AUTOMATED VEHICLE CONTROL

[75] Inventors: Michael P. Robins, Rugby; Malcolm T. Roberts, Oadby, both of England

[73] Assignee: The General Electric Company, p.l.c., England

[21] Appl. No.: 346,129

[22] Filed: May 2, 1989

[30] Foreign Application Priority Data

May 13, 1988 [GB] United Kingdom ............. 8811442

[51] Int. Cl.$^5$ .............................. G06F 15/50
[52] U.S. Cl. ......................... 364/424.02; 180/167; 180/169; 318/587
[58] Field of Search ............ 364/444, 449, 424.02, 364/513; 180/167, 168, 169; 318/587

[56] References Cited

U.S. PATENT DOCUMENTS

| | | | |
|---|---|---|---|
| 4,700,301 | 10/1987 | Dyke | 364/424.02 |
| 4,716,530 | 12/1987 | Ogawa et al. | 364/424.02 |
| 4,796,198 | 1/1989 | Boultinghouse et al. | 180/167 |

Primary Examiner—Gary Chin
Attorney, Agent, or Firm—Kirschstein, Ottinger, Israel & Schiffmiller

[57] ABSTRACT

In a guidance system for guiding an automated vehicle around an area such as a warehouse, a scanning laser beam from a source mounted on the vehicle impinges upon reflectors located around the area. Each reflector incorporates an optical code which identifies that reflector. Laser light reflected back to the vehicle from the reflectors is used to control the movement and heading of the vehicle. The area is divided notionally into a number of equal sub-areas of predetermined dimensions, each having at least two differently-coded reflectors. The vehicle is first moved to a position from which it can scan initialization reflectors located at selected initialization positions. The navigation system determines the initial position of the vehicle relative to the initialization reflectors and, during subsequent movements of the vehicle around the area, measures the distances and directions travelled by the vehicle from the initial position so that the navigation system can determine in which sub-area the vehicle is located at any instant. Because the system always knows in which sub-area the vehicle is located, it is not necessary for every reflector to have a unique code, so some duplication of codes around the area can be tolerated, thereby increasing the number of available reflectors for a given number of code elements.

5 Claims, 2 Drawing Sheets

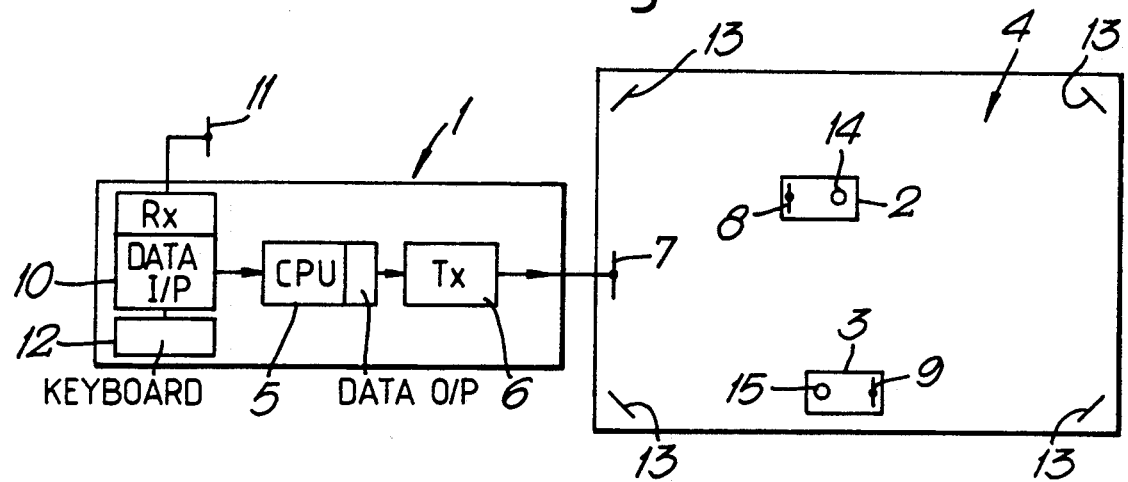
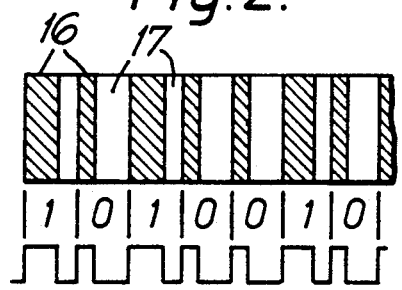
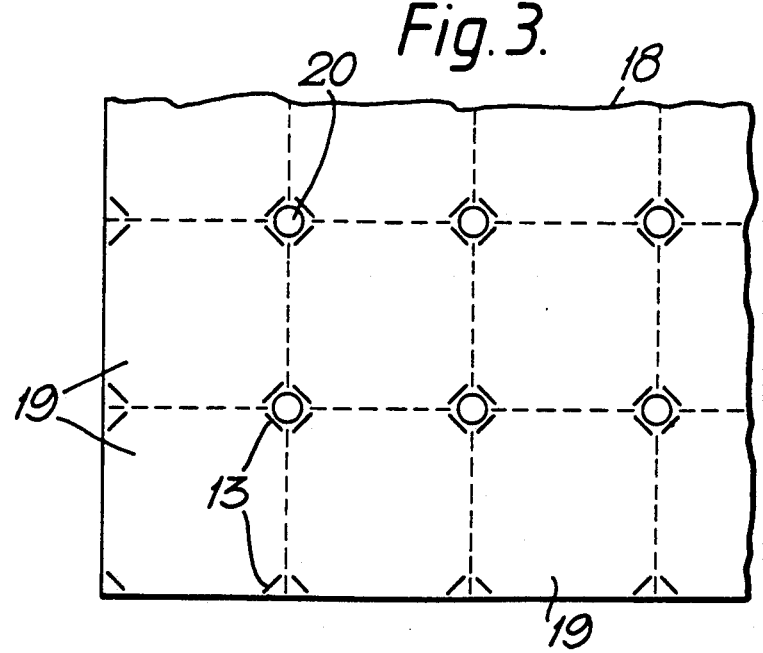

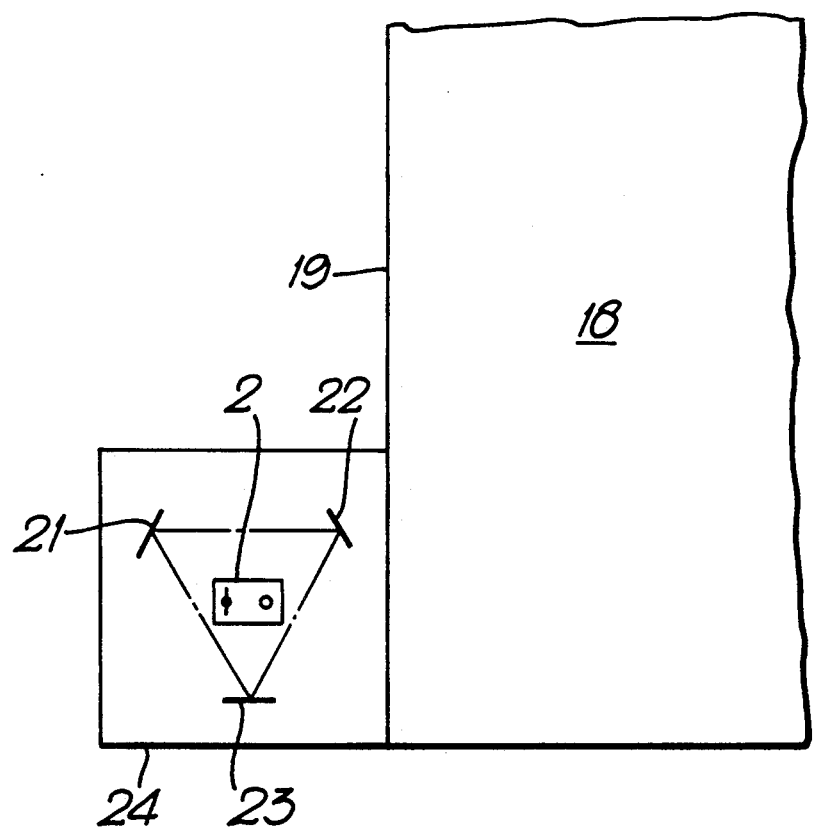

AUTOMATED VEHICLE CONTROL

BACKGROUND OF THE INVENTION

1. Field of the Invention

This invention relates to the control of automated vehicles which move around a site, such as a factory or a warehouse, in accordance with control signals generated by a computer. The invention is particularly relevant to vehicles which are controlled over radio or other remote control links and do not rely on guidance wires or tracks.

2. Description of Related Art

British Patent No. 2,143,395 (assigned to the same assignee as the instant application) discloses such a system in which a number of mobile trucks are controlled and guided under the overall control of a base station. The trucks are utilised to transfer material between a store area and a work position. Finished work-pieces are transferred by means of one of the trucks to a holding area for removal and utilisation as required. The base station allocates destinations to each of the trucks via a communication link, such as a radio or infra-red link.

Each vehicle has a scanning laser beam which rotates in azimuth so that it scans across a number of reflector boards which are spaced apart around the site. Each reflector board is provided with uniquely coded strips of a retro-reflective material which is such that the laser beam incident thereon is reflected back along the same path. Each vehicle is therby able, using triangulation techiniques, to determine its own position relative to any location within the site. Each vehicle monitors its own position as it moves along a path to its required destination, and continuously transmits its position back to the base station, so that the base station can control the truck movements so as to avoid collisions.

The retro-reflective stripes and the non-reflective stripes therebetween form a unique bar code on each reflector board. When the stripes are scanned sequentially by the laser beam, the first few stripes in the sequence provide a code which confirms that a reflector board has been found (as distinct from any other reflective body which might be encountered). The next stripes in the sequence identify the particular target board which is being interrogated, and the final stripe indicates the position of the end of the reflector board with a high degree of accuracy, for determination of the position of the vehicle.

It will be apparent that the reflector boards must not be made too large, or they will encroach upon the area available for vehicle and personnel movements. On the other hand, the stripes must not be too narrow, or the reliability of code reading will be unacceptable. It follows, therefore, that for an acceptable board size and an acceptable stripe width, only a limited number of stripes, and hence only a limited number of uniquely-coded boards, can be provided.

If a large site area is to be covered, it will not be possible to provide enough uniquely-coded boards to provide a workable system.

SUMMARY OF THE INVENTION

It is an object of the present invention to alleviate that potential limitation of out vehicle navigation system.

According to the invention there is provided a method of operating a vehicle guidance and control system of the kind including a vehicle having motive power and steering, a navigation system and means for transmitting a directional laser beam which is scanned in a predetermined sense; a plurality of reflectors spaced apart from each other, each incorporating an optical code which identifies that reflector, and each of which is located so as to be capable of intercepting the laser beam; and means to utilise light reflected back to the vehicle by at least two reflectors for controlling the movement and heading of the vehicle; the method comprising the steps of notionally dividing an area in which the vehicle is to operate into a plurality of equal sub-areas of predetermined dimensions, each provided with a plurality of the reflectors; positioning the vehicle at an initial location from which its laser beam can scan initialisation reflectors located at positions selected for initialisation of its navigation system; feeding to the navigation system data defining the positions of the initialisation reflectors; and causing the navigation system to determine the position of the vehicle with respect to the initialisation reflectors; whereby, during subsequent movement of the vehicle around the area, the navigation system is operative, by measurement of distances and directions travelled by the vehicle from said initial location, to determine in which sub-area the vehicle is located at any instant.

Preferably, three initialisation reflectors will be scanned, unless the vehicle has means, such as a compass, for determining its heading, when two reflectors will be sufficient.

Whereas in the system of said British patent it was essential that all reflectors be uniquely coded, the method of the present invention allows duplication of reflector codes in different sub-areas, because at any instant the vehicle can determine in which sub-area it is located and so can differentiate between a reflector in one sub-area and an identically-coded reflector in another sub-area.

BRIEF DESCRIPTION OF THE DRAWINGS

An embodiment of the invention will now be described, by way of example, with reference to the accompanying drawings, in which FIG. 1 is a schematic block diagram of vehicle control and guidance apparatus, FIG. 2 illustrates an example of a coded reflective target, FIG. 3 illustrates part of a vehicle movement area, divided into sub-areas, and FIG. 4 illustrates part of the area of FIG. 3 provided with initialisation targets in accordance with the invention.

DETAILED DESCRIPTION OF THE PREFERRED EMBODIMENTS

Referring to FIG. 1, a controller 1 for controlling the movement of vehicles, such as the vehicles 2 and 3, around an area 4 comprises a computer 5 which generates vehicle control signals which are fed to a radio transmitter 6. The signals are used to modulate a carrier wave which is transmitted via an antenna 7 and is received by antennas 8 and 9 on the vehicles 2 and 3. Data are fed into the computer 5 from data input means 10 which includes a radio receiver which receives position data from the vehicles 2 and 3 via an antenna 11. The data may alternatively be transmitted by other means, such as via an ultra sonic or laser link. The data input means may also comprise sensors for the automatic sensing of conditions within the area, and a keyboard 12 is provided for manual data entry.

The navigation system of each vehicle is preferably as described in the above-mentioned British Pat. No. 2,143,395. For navigation purposes, coded retro-reflective targets 13 are positioned around the area 4. Rotary laser scanners 14, 15 are fitted on the vehicles 2 and 3, respectively, and the navigation system of each vehicle continously determines, from reflections from the coded targets, and by triangulation, the exact position of the respective vehicle relative to those targets in the manner taught in said British patent.

FIG. 2 shows an example of a coded reflective target 13. The target has alternate reflective stripes 16 and non-reflective stripes 17. The widths of the stripes determine the code elements, so that a wide reflective stripe follwed by a narrow non-reflective stripe represents a digital 1 element, and a narrow reflective stripe followed by a wide non-reflective stripe represents a digital 0 element. As stated above, a number of the code elements are used to confirm that the laser beam reflections are received from a target and not from some other reflective surface. The number of pairs of stripes available for encoding the target identity, without making the target excessively large, may be limited to, say, five, so that only thirty-two different reflector codes can be achieved.

FIG. 3 represents a plan of part of a very large area 18 over which vehicles are to move. Such area may be, for example, 700 m×400 m. There is, of course, a limit to the distance over which the laser beams from the scanners 14 and 15 can be projected and still result in a readable reflection. Hence, the reflective targets must not be spaced apart by more than, say, 40 m. The area is therefore divided into sub-areas 19, which are preferably square and are preferably of 32.767 meters side. The latter dimension is chosen as convenient when a 16-bit word is used for characterising the position, the most significant bit being used to indicate polarity. The largest number which can be represented by the remaining fifteen bits is then 32,767. Four reflective targets 13 are located in each square, the targets being affixed to walls, where available, or otherwise to posts 20 or other supports.

It will be apparent from FIG. 3 that even that small part of the total area requires more than the thirty-two available different target codes. If the target codes were merely repeated around the area, the navigation system of a vehicle would not be able to determine, by scanning the targets, just where in the overall area the vehicle is located; i.e. unique positional data would not be obtainable.

In the present invention this problem is overcome in the following manner. Referring to FIG. 4, three datum reflective targets 21, 22 and 23 are mounted, preferably at the apices of an equilateral triangle, within an area 24, such as a garaging area, adjoining the area 18. The locations of the datum targets are very accurately determined and are stored in the computer 5.

In operation of the system, a vehicle, such as the vehicle 2, is firstly located within the triangle defined between the targets 21-23, and its scanner scans the datum targets so that its navigation system can accurately determine the initial position of the vehicle relative to those targets, and its initial heading using a technique similar to that used for determining the position and heading of the moving vehicle in the above-mentioned British patent. Thereafter, as the vehicle moves about the area 18, the navigation system keeps a record of the present distance of the vehicle from the initialisation datum position and the present heading of the vehicle. In that way the navigation system always has a record of which sub-area is occupied by the vehicle at any instant and can then determine positional data accurately from the targets in that sub-area.

The datum targets may be located at any other desired position within or alongside the area 18. Indeed, three of the targets 13 within any of the sub-areas may be treated as datum targets. One or more further sets of datum targets may be located around the area to avoid the need for the vehicle to travel a large distance for the initialisation process.

We claim:

1. A method of operating a vehicle guidance and control system including
   (A) a vehicle having motive power and steering, a navigation system, and means for transmitting a directional laser beam which is scanned in a predetermined sense;
   (B) a plurality of reflectors spaced apart from one another, each reflector incorporating an optical code which identifies that reflector, and each reflector being operative to reflect light from said laser beam when said beam impinges thereon; and
   (c) means for utilizing said light reflected back to the vehicle by at least two said reflectors for controlling the movement and heading of the vehicle,
   said method comprising the steps of:
   (i) notionally dividing an area in which the vehicle is to freely operate into a plurality of equal subareas of predetermined dimension, each sub-area being provided with a plurality of said reflectors;
   (ii) positioning the vehicle at an initial location from which its laser beam can scan a plurality of initialization reflectors, each incorporating a unique optical code, the initialization reflectors being located at positions selected for initialization of said navigation system;
   (iii) feeding to said navigation system data defining the positions of said initialization reflectors; and
   (iv) causing the navigation system to determine the position of the vehicle with respect to said initialization reflectors,
   whereby, during subsequent movement of the vehicle around the area, the navigation system is operative, by measurement of distances and directions traveled by the vehicle from said initial location, to determine in which sub-area the vehicle is located at any instant.

2. A method as claimed in claim 1, wherein three said initialization reflectors are used to provide initial position and heading data for said initialization of the navigation system.

3. A method as claimed in claim 1, wherein two said initialization reflectors are used to provide initial position data for said initialization of the navigation system; and wherein means is provided on the vehicle for determining the heading of the vehicle during said initialization of the navigation system.

4. A method as claimed in claim 1, wherein the data defining the positions of the initialization reflectors are fed to the navigation system via a data link which transmits through free space.

5. A method as claimed in claim 4, wherein the link is a radio link.

* * * * *